sium methoxide, ethoxide or butoxide in methanol, ethyl
United States Patent Office 2,702,249
Patented Feb. 15, 1955

2,702,249

REACTION PRODUCT OF A SUGAR AND AN AMINO COMPOUND, AND PROCESS OF MAKING SAME

Ronald J. Baird, Philadelphia, Pa., assignor to The National Sugar Refining Company, New York, N. Y., a corporation of New Jersey No Drawing. Application November 22, 1950,
Serial No. 197,170

20 Claims. (Cl. 106—126)

The present invention relates to the reaction product of (1) dextrin or a sugar selected from the mono- and oligo-saccharides and (2) an N-halogen derivative of an organic amino compound, and to a process of making same. More particularly it relates to the reaction product of dextrin or such a sugar and an N-halogen derivative of an organic amine or amide.

The invention also relates to a process for reacting dextrin or such a sugar with an amino compound of the above type.

The invention also relates to compositions of glue and the above type of reaction product.

The reaction products of this invention have physical and chemical properties which make them desirable as plasticizers, particularly for animal glue, to make it flexible and non-drying, that is, to prevent it from drying to a brittle state under atmospheric conditions.

The reaction products can also be used for plasticizing zein and as plasticizers for paper.

In my present invention a sodium or other metal derivative of a sugar is caused to react with a halogen derivative of the amino compound as, for example, with the halogen derivative of an amide. The reaction can be carried out in an inert solvent or liquid medium in which one or both of the reagents is soluble.

The metal derivative of the sugar may be prepared by known methods, for example, by exposing the sugar to the action of an oxide or hydroxide of the metal or to an alkoxide of the metal. In some cases the finely divided metal itself may be used to prepare the sugar derivative. Examples of such metal derivatives are mono- or disodium saccharate, or one of the calcium saccharates, or an alkali glucosate, such as potassium glucosate, or a metal derivative of dextrin. Thus, the saccharate just mentioned and referred to elsewhere in this specification is the non-carboxylate species, that is, the type obtained by the reaction as just noted of the metal at an hydroxyl group of the sugar (the carbohydrate), as distinguished from the carboxylate species obtained when the reaction of the metal is with the carboxylic acid radical in a sugar acid.

The halogen derivatives of the amino compounds which may be used in this invention are those which are prepared by the addition of a halogen or a hydrogen halide to a nitrogen in the amino compound. For example, dichloroadipamide, hexachloromelamine, mono- or di-chlorourea, urea subhydrochloride, chlorodicyandiamine, N-chloro-acetamide, or chloramine may be used.

The reaction may be carried out in water, which dissolves the metal sugar reagent and many of the nitrogen halide reagents, or it may be carried out in an organic medium which is a solvent for, but does not react with, the nitrogen halide reagent. In the latter case the metal sugar reagent should be in a very finely divided anhydrous form, since it is insoluble in the organic solvent. For example, ethyl alcohol or dioxane may be used, but methanol is the preferred solvent. When chlorourea is used with methanol, it is necessary to keep the solution cool to prevent reaction with the solvent.

A salt is a by-product which precipitates out during the reaction when an organic medium is used, and can be separated by filtration. When water is used as the medium, the salt is in solution and remains mixed with the product on concentration. To remove the salt in this case, it is necessary to dissolve the dried product in methanol, filter off the insoluble salt, and again concentrate the product which is now free from the salt.

One method of preparing the metal sugar reagent which I have found to be particularly advantageous for carrying out this reaction is as follows: The sugar is first dissolved in a non-aqueous medium such as monoisopropylamine, mono-n-propylamine, mono-n-butylamine, monoethanolamine, diethanolamine, etc. To this solution is then added a solution of sodium hydroxide or potassium hydroxide in methanol, or, if a perfectly anhydrous saccharate is desired, a solution of an alkali metal alkoxide in the corresponding alcohol, such as sodium or potasor butyl alcohols.

On mixing the two solutions there is precipitated the saccharate of the metal, which may be separated from the mixture of solvents by filtration or by distillation. The two solvents can be separated by distillation and used repeatedly.

When the reaction is carried out in a medium, for example dioxane, in which the product is insoluble, it is necessary, if desired to obtain the product free from salt, to extract the product with methanol and then remove the methanol by evaporation.

Although the reaction taking place is not known with exactness and certainty, there is apparently a reaction between the dextrin or sugar compound and the halogen derivative of the amino compound with the elimination of the salt together with other unknown side reactions which may include a degradation of the sugar molecule.

The product is in general soluble in water and also alcohols, such as methanol and in dihydric or polyhydric alcohols and slightly soluble in pyridine. It is in general insoluble in acetone, ethyl acetate, hydrocarbons such as benzene and normal heptane, and in carbon tetrachloride.

The average molecular weight of the product, freed from solvents, may range from 70 to about 140, and will ordinarily be within about 88 to 116 except in the case of the dextrin product, where the molecular weight may vary considerably, but will in general be higher.

The polarization of the solvent free product made from sucrose will range from about plus 50 degrees to about plus 65 degrees, measured on the International Sugar Scale (referred to in Brown & Zerban "Sugar Analysis," 3rd edition (1941), John Wiley & Co., New York, N. Y., for example, at page 179).

The nitrogen content of the product may vary with the particular amino compound used, but with the salt-free urea sucrose would be between about 8% and 18%.

Ordinarily there is a small amount of combined chlorine in the product, which may range from about 2% to about 5%.

In general, the properties of the product are different from any mixture of the sugar and the amino compound used as reagents. In appearance it is amorphous, ranging from a thick sirup to a glassy appearance.

The reaction product comprises polyhydroxy residues of the sugar in association with the amino residues.

The following are examples of the process and product.

Example 1

A mixture of 77.2 grams of disodium saccharate in 200 milliliters of methanol was stirred while a solution of 38.3 grams of chlorinated urea diluted with 40 milliliters of methanol was gradually added avoiding an excess which would cause the pH to drop to 7. The temperature was kept below 40° C. by regulating the rate of addition. The chlorinated urea used above was made by chlorinating 24 grams of urea (0.4 mole) until it gained 14.3 grams of chlorine (0.403 mole).

After stirring the reaction mixture for one hour at room temperature, it was heated to 60° C. for one hour. The pH was then slightly above 7. It was chilled to 5° C. and filtered. The residue weighed 13.8 grams and the concentrated filtrate weighed 93.4 grams.

Example 2

A slurry of 77.2 grams of dry disodium saccharate in 200 milliliters of methanol was reacted as in the previous example with about 95 milliliters of urea sub-hydrochloride so as to maintain the pH just above 7 on completion of the reaction.

The urea reagent was made by bubbling dry hydrogen chloride into a mixture of 84 grams of urea and 100 milliliters of methanol, whereat all the urea dissolved, until the solution analyzed 23% hydrogen chloride based on the solids.

The yield of concentrated product was 119 grams. The residue insoluble in methanol (cooled to 5° C. before filtration) weighed 11.4 grams.

*Example 3*

As in the previous examples, a mixture of 0.15 mole of disodium saccharate was reacted with a methanol solution of chlorinated urea containing 0.559 mole of urea and 0.257 mole of chlorine. The yield from the concentrated filtrate was 87.18 grams and the part insoluble in methanol weighed 8.0 grams.

*Example 4*

A suspension of 36.4 grams of monosodium saccharate (0.1 mole) in 100 milliliters of methanol was cooled in an ice bath while 7.1 grams of N-dichlorobutylamine (0.05 mole) was added slowly with stirring. The bath was removed and the temperature was allowed to rise slowly to 28° C. and then maintained at 28–30° C. for two hours. The temperature of the mixture was then raised to 65–70° C. for 1½ hours. The pH was maintained above 7 by adding small quantities of sodium saccharate as required.

The mixture was cooled, the salt was separated by filtration, and the solution evaporated to yield 39 grams of product.

*Example 5*

A mixture of 72.8 grams of dry monosodium saccharate (0.2 mole) in 200 milliliters of methanol was stirred while a solution of 11.1 grams of N-hexachloromelamine (0.0333 mole) in 100 milliliters of methanol was added gradually during 20 minutes. The heat of reaction caused the temperature to rise to 30–40° C., at which point it was held by a cold water bath. When no further heat was generated the mixture was heated at 50° C. for 1½ hours, 2 more grams of sodium saccharate being added to prevent the pH from dropping below 7.

The mixture was cooled and filtered, and the solution was concentrated to yield 41 grams of solid, fusible material, which was a good plasticizer for zein.

*Example 6*

To a suspension of 57.9 grams of dry powdered disodium saccharate (0.15 mole) in 110 milliliters of methanol was added with stirring a slurry of 31.9 grams of N,N-dichloroadipamide (0.15 mole) in methanol. The temperature was maintained at 25–30° C. during the addition, which lasted for 15 minutes.

The mixture was then stirred and heated in a bath at 50–60° C. Further additions of dichloroadipamide were made from time to time to maintain the pH at about 7.5. The additional dichloroadipamide used was 3.2 grams. The time of heating was 4½ hours.

The reaction mixture was then cooled to 3° C. and filtered, the insoluble part being washed with methanol. The weight of insoluble salt was 9.1 grams. The combined filtrate and washings was partly concentrated, filtered again to remove a further quantity of insoluble material, and finally concentrated to dryness. The yield was 66.9 grams.

*Example 7*

In a 5-gallon, glass-lined, jacketed autoclave, provided with mechanical stirrer, a solution of 7.33 kilograms of raw cane sugar in 1.67 liters of water was treated with a hot solution of 0.815 kilogram of sodium hydroxide dissolved in 0.4 liter of water. The cooled saccharate solution was then diluted with 2 liters of methanol.

To this solution was added with stirring during 1½ hours a solution of chlorinated urea made by absorbing 0.565 kilogram of chlorine in 1.249 kilograms of urea and dissolving the product in 1.20 liters of methanol. This chlorinated urea solution, which was cooled to maintain the temperature below 20° C., analyzed 0.2390 gram total chlorine and 0.2440 gram available chlorine per milliliter.

During the addition the temperature of the reaction mixture was maintained at 30° to 40° C. by running cold water in the jacket of the autoclave. After the addition the temperature was raised to 50° and maintained at 50° for 1 hour.

The mixture was cooled to 20° C., filtered from the salt which separated out, and concentrated to about 90–95% solids. The yield was 8.36 kilograms.

*Example 8*

Dextrose (36 grams, 0.2 mole) was dissolved in 50 milliliters of water. A 50% aqueous solution of sodium hydroxide containing 8 grams of the alkali (0.2 mole) was mixed with the dextrose solution while the temperature was kept below 20° C. The solution was cooled to 5° and reacted with a methanol solution (60 milliliters) containing 12 grams of urea (0.2 mole) to which 7.1 grams (0.2 gram-atom) of chlorine had been added before dissolving in methanol.

The reaction temperature was kept at 5° C. during the mixing of the solutions, then gradually allowed to rise, finally being maintained at 50° C. for one hour.

The product was evaporated to dryness and then extracted with methanol. The weight of methanol-soluble product was 41.8 grams.

*Example 9*

A solution of invert sugar was used instead of the dextrose solution as in the previous example, and reacted similarly to give a similar product.

*Example 10*

To 51.3 grams of sugar (0.15 mole) dissolved in 75 grams of monoethanolamine by warming at 50° C. was added 140 milliliters of a sodium hydroxide solution in methanol containing 12 grams sodium hydroxide (0.3 mole). The mixture was heated under reflux for 1 hour, then allowed to cool, filtered and the residue washed once with 100 milliliters of methanol. The filtrate was subjected to distillation to recover the methanol and ethanolamine, the latter being removed under reduced pressure. A residue of disodium saccharate from this distillation was combined with the bulk of the saccharate filtered off.

The combined residue was suspended in 100 milliliters of methanol and stirred while a methanol solution of chlorinated urea containing 18 grams of urea (0.3 mole) and 10.65 grams of chlorine (0.3 gram-atom) was added during 15 minutes. The mixture was stirred at room temperature for 5 minutes, heated to 60° C. for 45 minutes, chilled to 5° C. and filtered. The insoluble part weighed 6.5 grams and the product obtained by concentration of the filtrate to remove all the solvent weighed 98 grams.

*Example 11*

34.2 grams of sucrose (0.1 mole) was dissolved at room temperature in 80 milliliters of isopropylamine. To this solution was added, with vigorous stirring, 62.5 milliliters of a methanol solution of sodium hydroxide, containing 0.1281 grams of sodium hydroxide per milliliter (=0.2 mole). 80 milliliters of methanol was then added and the mixture was heated to distill 138 milliliters of amine-methanol mixture. 160 milliliters more methanol was added, then a solution of chlorinated urea containing 20.5 grams of urea (0.342 mole) and 11.9 grams of chlorine (0.335 gram-atom) in methanol to make 54 milliliters. The addition was made slowly while stirring. The mixture was then heated for one hour in a bath at 80° C. while distilling methanol with the remaining amine until a total of 130 milliliters had distilled. The mixture was cooled and filtered and the solution was evaporated to yield 54.6 grams of material.

An example of the glue plasticized with one of the above compounds for use in book binding and in binders for cork and other material, comprises approximately equal parts of animal glue, water and the above plasticizer. The glue composition is formed by soaking one part of glue in one part of water for from 8 to 24 hours, then melting it by heating at 50° C. to 80° C., then blending in one part of the plasticizer—all parts being by weight. The mixture is stirred until homogeneous, then poured into greased molds and allowed to set. It may then be removed from the molds and stored for an indefinite period of time before use. The blocks of molded glue composition remain in a plastic state and may be melted for use directly or with the addition of water, as desired.

When used in the binding of books or for binding cork or other materials, the glue composition remains plastic even after loss of part of its water content.

Having described my invention, what I claim is:

1. A plasticizer comprising the reaction product, after elimination of a metal halide, of (a) a metal derivative of the non-carboxylate type of a carbohydrate which is a member of the class consisting of dextrin and a mono-saccharide and an oligo-saccharide sugar, with (b) an N-halogen derivative of an organic compound containing nitrogen in an amino group and being a member of the class consisting of an amine and an amide, said N-halogen derivative being free of substituents that interfere with its linking with the carbohydrate by replacement of the metal to eliminate the metal halide, said plasticizer being soluble in water, in lower monohydric alcohols and in polyhydric alcohols, and having a nitrogen content of from about 8% to about 18%.

2. The product of claim 1, in which the amino nitrogen containing compound is an amide.

3. The product of claim 1, in which the amino nitrogen containing compound is urea.

4. The product of claim 1, in which the sugar is sucrose and the amino nitrogen containing compound is urea.

5. The product of claim 4, in which the average molecular weight is between about 88 and about 116, and in which the optical rotation is between about plus 50° and plus 65° on the International Sugar Scale.

6. The product of claim 1, in which the sugar is a hexose.

7. The product of claim 1, in which said sugar is glucose.

8. The product of claim 1, in which said sugar is invert.

9. A glue composition comprising equal parts of animal glue and the reaction product, after the elimination of a metal halide, of (a) a metal derivative of the non-carboxylate type of a carbohydrate which is a member of the class consisting of dextrin and a mono-saccharide and an oligo-saccharide sugar, with (b) an N-halogen derivative of an organic compound containing nitrogen in an amino group and being a member of the class consisting of an amine and an amide, said N-halogen derivative being free of substituents that interfere with its linking with the carbohydrate by replacement of the metal to eliminate the metal halide, said reaction product being soluble in water and in lower monohydric alcohols, and having a nitrogen content between about 8% and 18%.

10. The process of making a plasticizer for at least glue, zein and paper, which comprises mixing (a) a metal derivative of the non-carboxylate type of a carbohydrate which is a member of the class consisting of dextrin and a mono-saccharide and an oligo-saccharide sugar, and (b) an N-halogen derivative of an organic compound containing nitrogen in an amino group and being a member of the class consisting of an amine and an amide, said N-halogen derivative being free of substituents that interfere with its linking with the carbohydrate by replacement of the metal to eliminate the metal halide, and heating the mixture to initiate the reaction when mixing alone does not do so.

11. A method of making a reaction product of a sugar which is a member of the class consisting of the mono-saccharide and oligo-saccharide sugars, with an organic compound containing nitrogen in an amino group, which method comprises dissolving the sugar in an amine solvent for the sugar, adding to the solution an alkoxide in an alcohol and also adding an N-halogen derivative of an organic compound containing nitrogen in an amino group, which compound is a member of the class consisting of an amine and an amide and the N-halogen derivative thereof is free of substituents that interfere with its linking with the sugar by replacement of the metal from a non-carboxylate type metal derivative of the sugar to eliminate the metal halide.

12. The process of claim 10, in which said metal sugar derivative is an alkali saccharate of the non-carboxylate type and in which said amino compound is an amide.

13. The process of claim 12, in which the reaction product is extracted with methanol.

14. The process of claim 10, in which said sugar is a hexose.

15. A process of making an alkali metal saccharate of the non-carboxylate type, which comprises dissolving a sugar which is a member of the class consisting of the monosaccharide and oligosaccharide sugars in an amine solvent for the sugar and adding to the solution a sufficient quantity of akali hydroxide, dissolved in an aliphatic alcohol solvent for it, to convert the sugar to the alkali metal saccharate.

16. A process of making an alkali metal saccharate of the non-carboxylate type, which comprises dissolving a sugar which is a member of the class consisting of the monosaccharide and the oligosaccharide sugars in an amine solvent for the sugar and adding thereto a solution of alkali hydroxide in methanol.

17. A process of making a metal sugar derivative which comprises dissolving a sugar which is a member of the class consisting of the monosaccharide and oligosaccharide sugars in an amine solvent for the sugar and adding thereto an alkoxide dissolved in an alcohol.

18. The process of claim 17, in which the amine is monoethanolamine, and the alkoxide is an alkali metal alkoxide and it is dissolved in an aliphatic alcohol corresponding to that of the alkyl group in the alkoxide.

19. The composition of claim 9, wherein the reaction product is that of sucrose as the carbohydrate and urea as the amino nitrogen containing compound.

20. A process of making a metal saccharate as claimed in claim 16, wherein the sugar is sucrose, the amine is isopropylamine and the alkali hydroxide is sodium hydroxide.

References Cited in the file of this patent

UNITED STATES PATENTS

| | | |
|---|---|---|
| 1,862,270 | Kallner et al. | June 7, 1932 |
| 2,116,640 | Quehl | May 10, 1938 |
| 2,145,695 | Mattiotto | Jan. 31, 1939 |
| 2,157,083 | Peterson et al. | May 2, 1939 |
| 2,188,099 | Drew | Jan. 23, 1940 |
| 2,399,603 | Rust et al. | Apr. 30, 1946 |
| 2,414,274 | Sass et al. | Jan. 14, 1947 |
| 2,518,135 | Gaver | Aug. 8, 1950 |

OTHER REFERENCES

Pigman, Carbohydrates Chem., 1948, pages 16–17.